(12) United States Patent
Watson et al.

(10) Patent No.: US 7,929,059 B2
(45) Date of Patent: Apr. 19, 2011

(54) CHANGING CHANNELS IN A DIGITAL BROADCAST SYSTEM

(75) Inventors: Scott Frazier Watson, Marina del Rey, CA (US); Gary Todd Masilko, South Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1321 days.

(21) Appl. No.: 11/351,892

(22) Filed: Feb. 10, 2006

(65) Prior Publication Data
US 2007/0188665 A1   Aug. 16, 2007

(51) Int. Cl.
*H04N 7/01* (2006.01)
(52) U.S. Cl. ...................................................... 348/725
(58) Field of Classification Search .................. None
See application file for complete search history.

(56) References Cited

U.S. PATENT DOCUMENTS

| | | | | |
|---|---|---|---|---|
| 6,002,443 | A * | 12/1999 | Iggulden | 348/553 |
| 6,169,844 | B1 * | 1/2001 | Arai | 386/83 |
| 6,490,001 | B1 | 12/2002 | Shintani et al. | |
| 6,714,264 | B1 | 3/2004 | Kempisty | |
| 6,938,208 | B2 | 8/2005 | Reichardt | |
| 7,283,722 | B2 * | 10/2007 | Kato | 386/46 |
| 2002/0047866 | A1 * | 4/2002 | Matsumoto et al. | 345/810 |
| 2002/0116713 | A1 * | 8/2002 | Mukai et al. | 725/58 |
| 2004/0031063 | A1 * | 2/2004 | Satoda | 725/143 |
| 2004/0034863 | A1 | 2/2004 | Barrett et al. | |
| 2004/0189879 | A1 * | 9/2004 | Read | 348/731 |
| 2004/0244037 | A1 | 12/2004 | Yamaguchi et al. | |
| 2005/0174483 | A1 | 8/2005 | Ruckriem | |

FOREIGN PATENT DOCUMENTS

| | | |
|---|---|---|
| EP | 0 712 242 A2 | 5/1996 |
| EP | 1 549 069 A1 | 6/2005 |
| WO | WO 01/06770 A1 | 1/2001 |

OTHER PUBLICATIONS

International Search Report for PCT/US2007/03413, 4 pages.
European Search Report for European Application No. 07750266.4, Jul. 1, 2010, 10 pages.

* cited by examiner

*Primary Examiner* — Paulos M Natnael
(74) *Attorney, Agent, or Firm* — Sidley Austin LLP (57) ABSTRACT

Methods, systems, and apparatus, including computer program products, for changing digital broadcast channels. In one implementation, upon receiving a request for switching to a new channel in a digital broadcast receiving device, the device switches from a power saving mode, in which the device processes time-slices only for the currently selected broadcast channel, to a channel changing mode, in which broadcast data is buffered for more than one broadcast channels in anticipation of channel surfing. In another implementation, the user's perception of the channel change delay is mitigated by displaying channel information about the newly selected channel.

23 Claims, 4 Drawing Sheets

CHANGING CHANNELS IN A DIGITAL BROADCAST SYSTEM

BACKGROUND

The present invention relates to digital broadcasts and, in particular, changing channels in a digital broadcast system.

In digital broadcasting, media programs, such as radio or television programs, are transmitted in digital format to multiple users. The digital programs can be broadcast by radio or television stations, from satellites, through cable, through a telephony network (e.g., Digital Subscriber Line (DSL)), over the Internet, or any other suitable means. More recently, for example, digital programs are broadcast over wireless or cellular networks. The broadcast programs can be received by television sets with digital receivers, desktop computers, or portable devices, such as laptop computers and handheld devices, for example, cell phones or personal digital assistants (PDAs).

The digital broadcast programs can include audio, video, data or any other media content in digital format. Typically, the broadcast programs are organized into one or more broadcast channels, where each broadcast channel represents a separate stream of media content. In some digital video broadcast systems, for example, video programs are organized into one or more video channels, where each video channel includes a separate stream of video programs. If the video programs include television programs, the video channels are traditionally referred to as television channels.

In traditional analog broadcast, data is transmitted for different broadcast channels on different carrier frequencies. Thus, data can be transmitted for multiple analog broadcast channels in parallel. In digital broadcast, however, multiple broadcast channels are often transmitted on the same one or more carrier frequencies using time division (time slicing) techniques, in which data for different broadcast channels are transmitted in different time segments or slices. Thus in digital broadcast, data is often transmitted only for one broadcast channel at a particular moment in time.

If a user switches from one broadcast channel to another, there is no perceptible delay in traditional analog broadcast, where data is broadcast for all channels in parallel. However, if a user changes channel in a digital broadcasting system that uses time division techniques, there can be a perceptible delay because a receiving device typically receives data only for one channel at any point in time. If the user switches to another broadcast channel, the receiver has to wait for the time slice in which data is broadcast for the new channel. Thus, the data often will be available for the new channel only after a noticeable delay.

The length of the delay for changing channels in a digital broadcast system depends on the implementation of the particular system. For example, if there are many channels and each requires its own respective time slice, or if relatively long time slices are used, the channel changing delay can be fairly long, for example, in the range of two to eight seconds. The delay may be exacerbated if the user is "channel surfing," that is, repeatedly switching to new channels, for example, by repeatedly issuing a "channel up" or "channel down" command.

Furthermore, any delay associated with channel changing may be more noticeable to a user who is receiving digital broadcasts on a handheld device, such as a cell phone or PDA, because such user may have a greater expectation of "instant" access. Regardless of the reason for channel changing delay in a digital broadcast system, if a user perceives the length of the delay to be significant, the overall user experience is downgraded, which may lead to user dissatisfaction.

SUMMARY

Embodiments of the present invention can mitigate or reduce the problem of delays associated with changing channels in a digital broadcast system. In one implementation, upon receiving a request for switching to a new channel in a digital broadcast receiving device, channel change delays are reduced by switching the device from a power saving mode, in which the device processes time-slices only for the currently selected broadcast channel, to a channel changing mode, in which broadcast data is buffered for more than one broadcast channels in anticipation of channel surfing. In another implementation, the user's perception of the channel change delay is mitigated by displaying channel information about the newly selected channel. The channel information can be stored in a memory so that it is available for display during the channel change delay.

In general, in one aspect, the present invention provides methods, systems, and apparatus, including software products, for operating a device having a receiver to receive digital broadcast including multiple broadcast channels. The receiver is operated in a power saving mode to receive broadcast data for a first channel of the multiple broadcast channels, where each broadcast channel represents a respective stream of media program, the broadcast data for the first channel is received during discrete first time slices, and the receiver is switched to a low power consuming state between the first time slices. A first user input indicating a channel change request is received, and upon receiving the first user input, the receiver is operated in a channel changing mode to receive broadcast data for each of the multiple broadcast channels.

Particular implementations can include one or more of the following features. The low power consuming state can be a stand-by state in which the receiver receives no broadcast data. The broadcast receiving device can be either a non-portable device or a portable device, such as a handheld device. The first user input can indicate a request to display a second channel of the multiple digitally broadcast channels. Upon receiving the first user input indicating the request to display the second channel, channel information can be presented about the second channel. The channel information about the second channel can include prestored information identifying a content provider for the second channel. The information identifying the content provider for the second channel can include a channel logo for the second channel. The channel information about the second channel can include information identifying a currently broadcast program in the second channel. The channel information can include a prestored video or animation, an advertisement, or information about pre-recorded programs from the second channel. The device can receive channel updating data and update the channel information based on the received channel updating data. The channel updating data can be displayed as it is received or stored in the device for later use. The first user input can indicate a request to present a program guide. Operating the receiver in the channel changing mode can include buffering broadcast data for each of the multiple broadcast channels. The buffered broadcast data can be used in the channel changing mode to present a current program in a broadcast channel selected from the multiple broadcast channels. Operating the receiver in the channel changing mode can include operating the receiver continuously in an active state. The device can be switched from the channel changing mode to the power saving mode. Switching from the channel changing mode to the power saving mode can include receiving a second user input requesting the switch to the power saving mode. The device can be switched to the power saving mode after a predetermined time in the channel changing mode. At least one of the multiple broadcast channels can represent a stream of television programs or a stream of audio programs.

In general, in another aspect, the present invention provides a digital broadcast receiving device that includes a receiver, a user input component, and a controller. The receiver receives digital broadcast that includes multiple broadcast channels transmitted in separate time slices. Each broadcast channel represents a respective stream of media programs. The receiver has a power saving mode and a channel changing mode. Broadcast data is received for a single channel in the power saving mode and for each of the multiple digital broadcast channels in the channel changing mode. The user input component receives a user input indicating a channel change request, and the controller operates the receiver in the channel changing mode upon receiving the user input indicating the channel change request.

Particular implementations can include one or more of the following features. The device can further include a battery to provide power for operating the digital broadcast receiving device without external power, a display to present the media programs, or a memory to store channel information about the plurality of broadcast channels. The channel information can include information identifying a respective content provider for each of the plurality of broadcast channels. The information identifying the respective content provider can include a respective channel logo, video, or animation for each of the multiple broadcast channels. The channel information can include information identifying one or more currently broadcast programs. The channel information can include an advertisement. The controller can be configured to access the channel information in the memory and to generate corresponding display information from the accessed information. The device can also include a bi-directional communication component to receive at least a portion of the channel information. The bi-directional communication component can also receive channel updating data. Operating the receiver in the channel changing mode can include buffering the broadcast data for each of the multiple broadcast channels. The controller can be configured to use the buffered data for channel surfing in the channel changing mode or to switch the receiver from the channel changing mode to the power saving mode after operating the receiver in the channel changing mode. The device can also include a signal detector to detect digital signals including the broadcast data. The signal detector can include an antenna.

In general, in another aspect, the present invention provides methods, systems, and apparatus, including software products, for operating a digital broadcast receiving device. The method includes receiving user input requesting a first broadcast channel to be displayed from multiple broadcast channels, where each broadcast channel represents a respective stream of media programs. Upon receiving the user input requesting the first broadcast channel, channel information associated with the first broadcast channel is presented. The method also includes verifying whether broadcast data is available for the first broadcast channel, and if the broadcast data is available, a current program in the first broadcast channel is displayed after presenting the channel information.

Particular implementations can include one or more of the following features. Each of the multiple broadcast channels can be broadcast in a respective time slice. Upon receiving the user input requesting the first broadcast channel, the device can be switched to a channel changing mode of operation in which broadcast data is buffered for each of the multiple broadcast channels. The device can be switched from the channel changing mode of operation to a power saving mode of operation in which broadcast data is received only for one broadcast channel. The channel information about the first broadcast channel can include information identifying a content provider for the first broadcast channel. The channel information can include prestored information. The information identifying the content provider for the first broadcast channel can include a channel logo for the first broadcast channel. The channel information about the first broadcast channel can include information identifying a currently broadcast program in the first broadcast channel. The channel information about the first broadcast channel can include an advertisement. Presenting the channel information can include displaying the channel information. Displaying the channel information can include displaying a video, data, an animation or other content. Presenting the channel information can include presenting an audio effect. Presenting the channel information can include presenting information about pre-recorded programs from the first broadcast channel. The channel information about the first broadcast channel can be received through a bi-directional communication component. The channel information about the first broadcast channel can be updated.

In general, in another aspect, the present invention provides methods, systems, and apparatus, including software products, for providing data to a device configured to receive digital broadcast including multiple broadcast channels, where each broadcast channel represents a respective stream of media program. Channel information is generated about a first broadcast channel in the multiple broadcast channels. The generated channel information is assigned to be presented during a channel change in the device. The generated channel information is transmitted to the device.

Particular implementations can include one or more of the following features. The generated channel information can include information identifying a first content provider corresponding to the first broadcast channel. The generated channel information can include information identifying content broadcast in the first broadcast channel. The generated channel information can include a video or an animation. The generated channel information can include an advertisement. The generated channel information can include duration information to enable the digital broadcast receiving device to control the time period associated with the channel change. The duration information can specify a duration required for an appropriate presentation of the channel information during or within the channel change time period.

Particular embodiments can be implemented to realize one or more of the following advantages. In the channel changing mode, buffered broadcast data can be used to display newly selected channels without waiting for a time slice in which data is broadcast for the newly selected channels. Thus, delays can be substantially decreased during channel surfing. To save power, the device can switch back to the power saving mode if no more channel change is requested. Thus, the channel change delay can be reduced at a small price in power consumption of the device. By promptly displaying information about a newly selected channel's content or content provider, the user may have the perception that the requested channel change took place without substantial delay. The displayed channel information can also help the user in identifying the newly selected channel, its content provider, or a current program in the newly selected channel. Thus, the displayed channel information can help the user in navigating through the different broadcast channels. The user's perception of the channel change delay can be further decreased if the displayed channel information includes animation or other special effects, such as short videos, brief advertisements, and audio effects, that may entertain the user during the channel change. The displayed channel information can also include information about pre-recorded shows that are associated with the newly selected channel, so that the user can select either the currently broadcast program or one of the pre-recorded shows. The displayed information can simply indicate that the newly selected channel also provides pre-recorded shows, or the pre-recorded shows can be directly selected based upon the displayed channel information. Thus, the user has a simple way to find and access pre-recorded shows without the need to open a full menu, such as an Electronic Program Guide (EPG). The displayed channel information can also include one or more advertisements to promote particular shows or commercial products.

The above and other technical advantages of various implementations of the present invention are readily apparent to one skilled in the art from the following figures, descriptions, and claims.

BRIEF DESCRIPTION OF THE DRAWINGS

Like reference numerals are used for like and corresponding parts of the various drawings.

DETAILED DESCRIPTION

Figure 1:
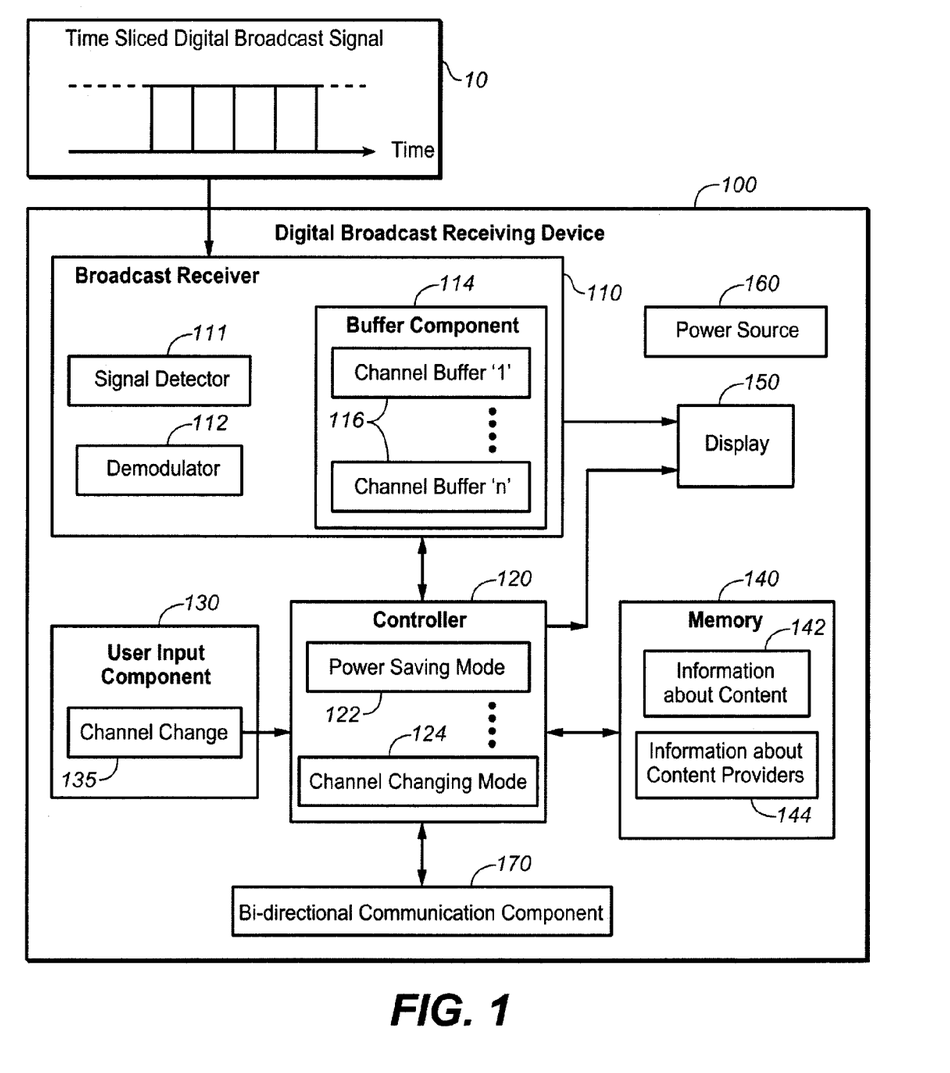
FIG. 1 is a schematic diagram illustrating a device receiving a digital broadcast.

FIG. 1 illustrates a digital broadcast receiving device 100 that receives and processes a digital broadcast signal 10 according to one aspect of the present invention. The digital broadcast signal 10 includes digital data for multiple broadcast channels transmitted with a time division technique. The digital broadcast signal 10 can be transmitted via television or radio broadcast, cable network, satellite, telephony network, Internet, wireless network, mobile network, or any other suitable means. The device 100 can be a portable device, such as a cell phone hand set, a PDA, a laptop computer or a specialized handheld device, or a non-portable device, such as a set top box, a television receiver or a desktop computer, or any other device capable to receive and process the digital broadcast signal 10.

In the embodiment illustrated in FIG. 1, the device 100 includes a broadcast receiver 110, a controller 120, a user input component 130, a memory 140, a display 150, and a power source 160. Optionally, the device 100 can also include a bi-directional communication component 170. The controller 120 can control the overall operation of the device 100, including the reception and processing of digital broadcast signals for presentation to a user. In one implementation, the controller 120 can operate the device 100 in a power saving mode 122 to minimize power consumption, or in a channel changing mode 124 to reduce channel change delays during channel surfing. The memory 140 stores information for the device 100. In one implementation, the memory 140 includes information 142 about content and information 144 about content providers. Portions of the content information 142 and the content provider information 144 can be displayed by the display 150 in the channel changing mode 124 to reduce any perceived delay associated with channel changing. The channel information, including the content information 142 and the content provider information 144, can be updated in the memory 140 with new or additional information or applications.

The digital broadcast signal 10 includes data for multiple broadcast channels. For example, about 10 to 15 channels can be broadcast to portable devices, such as cell phone hand sets, PDAs, or specialized handheld devices, and several tens or even over hundred channels can be broadcast to non-portable devices, such as set top boxes, digital television receivers, or desktop computers. In one implementation, each channel is broadcast periodically in separate time slices. For example, ten channels can be broadcast in ten consecutive time slices in a single cycle that lasts about six seconds and is periodically repeated. In alternative implementations, data can be transmitted for two or more channels in one time slice. The duration of the cycle or the duration of the time slices within the cycle can vary from cycle to cycle, and the digital broadcast signal 10 can include metadata related to the distribution and identification of the various time slices. The digital broadcast signal 10 can also include other broadcast protocol related information. In one implementation, the digital broadcast signal 10 follows, implements, or is formatted in one or more standards for digital broadcast, such as the Digital Video Broadcasting—Multimedia Home Platform (DVB-MHP) standard, the DVB-Handheld (DVB-H) standard, Forward Link Only (FLO™) standard or any other suitable standard.

The broadcast receiver 110 receives data for one or more broadcast channels in the digital broadcast signal 10. In one embodiment, the broadcast receiver 110 can include a signal detector 111, a demodulator 112, and a buffer component 114. The signal detector 111 detects the digital broadcast signal 10. For example, the signal detector 111 can include a radio antenna or an infrared detector. The demodulator 112 decodes the detected digital signal into broadcast data. As the digital broadcast signal 10 uses a time division technique, data for a particular channel is broadcast generally in discontinuous time slices, and the demodulator 112 provides the decoded broadcast data of the particular channel in "bursts" to the buffer component 114. The buffer component 114 temporarily stores or buffers the data bursts for the particular channel. From the buffer component 114, the buffered data can be transmitted to the display 150 such that the program of the particular broadcast channel can be displayed in a manner suitable for user viewing.

The buffer component 114 includes multiple (n) channel buffers 116 to buffer data in the channel changing mode 124. In one embodiment, each of the channel buffers 116 is configured to buffer data for a single broadcast channel, and the buffered data is transmitted to the display 150 from one of the channel buffers 116 at a time. Alternatively, the channel buffers 116 can be configured to buffer data for each broadcast channel, and the buffered data can be transmitted to the display 150 from more than one of the channel buffers 116 at a time, for example, in a preview or a multi-view context. The capacity of the buffers can be selected based on the resolution and particular format of the broadcast programs. If the digital broadcast 10 includes video programs in MPEG format, for example, the capacity of the buffers 116 can be selected such that the buffered data includes at least one index frame ("I-frame").

The device 100 uses multiple channel buffers 116 in the channel changing mode 124, and the number n of the channel buffers 116 can be selected to provide a smooth channel surfing experience. In one implementation, the number n of the channel buffers 116 is equal to a maximum number of broadcast channels in the digital broadcast 10. Alternatively, the number n of the channel buffers 116 can be less than the maximum number of broadcast channels.

The controller 120 controls the broadcast receiver 110, the display 150, and, if present, the bi-directional communication component 170. The controller 120 can store or update data in and retrieve data from the memory 140. The controller 120 also receives user input; such as channel change requests 135, from the user input component 130.

In one embodiment, the digital broadcast receiving device 100 can operate alternately between the power saving mode 122 and the channel changing mode 124. The power saving mode 122 is used when a currently selected broadcast channel is displayed for a longer period of time. In the power saving mode 122, the controller 120 instructs the broadcast receiver 110 to decode and buffer data only for the currently selected broadcast channel. The controller 120 switches the broadcast receiver 110 into a "stand-by" state between those time slices that include data for the currently selected broadcast channel. In the "stand-by" state, the broadcast receiver 110 does not receive broadcast data, and accordingly, no such data is detected by the detector 111 or decoded by the demodulator 112 for any of the channels not currently selected. Thus, the device 100 can save power, and at the same time, the previously buffered broadcast data can be transmitted from the buffer component 114 to the display 150 to provide a continuous data stream for displaying the current channel.

Upon receiving a channel change request 135 from the user input component 130, the controller 120 switches the digital broadcast receiving device 100 from the power saving mode 122 to the channel changing mode 124. In the channel changing mode 124, the controller 120 instructs the broadcast receiver 110 to detect broadcast data, and decode and buffer data for one or more broadcast channels in addition to the currently selected one. The additional broadcast channels are buffered in anticipation of channel surfing, that is, in preparing the device 100 to respond to further channel change requests 135. If a further channel change request 135 selects one of the buffered broadcast channels, the newly selected channel can be displayed by the display 150 without substantial delay, because data is readily available for that channel in the buffer component 114. Thus, the channel change delay can be substantially reduced during channel surfing.

In one implementation, the total number of broadcast channels in the digital broadcast signal 10 is less than or equal to the number n of the channel buffers 116. Thus, the device 100 can buffer each broadcast channel in a respective channel buffer in the channel changing mode 124. In alternative implementations, only a subset of the broadcast channels are buffered in the buffer component 114. For example, some of the channel buffers 116 can be designated to buffer broadcast channels that are likely to be selected by the user during channel surfing. The likely channels can include neighboring channels that are available from a currently selected channel by a few Channel Up or Channel Down commands. Or the likely channels can include the user's "favorite" channels. The favorite channels can be identified by user input designating the favorite channels, or determined based on a history of prior channel selections of the user.

In the channel changing mode 124, the broadcast receiver 110 is in its fully active state during additional time slices to receive and buffer data for the additional channels. Thus, the broadcast receiver 110 remains in the fully active state for a longer period than in the power saving mode 122, and its power consumption becomes higher in the channel changing mode 124 than in the power saving mode 122. In one implementation, the broadcast receiver 110 remains continuously in its fully active state in the channel changing mode. Alternatively, if less than all the broadcast channels are buffered in the buffer component 114, the broadcast receiver 110 can be switched to the stand-by state during time slices that have no broadcast data for the buffered channels.

The controller 120 can switch back the device 100 from the channel changing mode 124 to the power saving mode 122 automatically or upon receiving a user input requesting the power saving mode 122. Thus, the increase in power consumption can be limited to a short time.

The user input component 130 receives user input, such as the channel change request 135, from a user of the device 100. The user input component 130 can include keys, buttons, a pointing device, a touch pad, a remote control, a voice recognition system, or any other type of user input receiving means. The channel change request 135 can specify a new broadcast channel to be displayed. For example, the user can enter the channel change request 135 by activating a "Channel Up" or a "Channel Down" button, or pressing numeric keys corresponding to the selected channel. The channel change request 135 can also be non-channel specific, for example, requesting a broadcast channel guide, such as an electronic program guide ("EPG"). Thus, the user can also enter the channel change request 135 by pressing a "Menu" or "EPG" button of the user input component 130.

The memory 140 stores channel information, such as the content information 142 and the content provider information 144. The content information 142 identifies broadcast programs for one or more broadcast channels in the digital broadcast 10. For example, the content information 142 can specify the titles of the currently broadcast programs. The content information 142 can also include a content description of the identified broadcast programs. The content description can specify, for example, a genre, a director, or one or more main actors of the corresponding broadcast program. The channel information, or a portion of it, can be updated in the memory 140.

The content provider information 144 identifies respective content providers for one or more broadcast channels in the digital broadcast 10. For example, the information 144 can identify content providers, which are commonly associated with various TV channels, such as Disney®, ABC®, and ESPN®. The information 144 can identify one or more content providers with their respective channel logos. The content provider information 144 can also include additional information about the content providers or the corresponding broadcast channels. For example, the additional information can specify program schedules, advertise future shows, or present a list of pre-recorded shows from the same broadcast channel. The pre-recorded shows can be previously recorded by the user or provided on-demand by the content provider of the broadcast channel.

Optionally, the channel information can also include one or more advertisements for commercial products or services. These advertisements can be configured to be presented with the content information 142 or the content provider information 144 for a particular channel. The advertisements can be provided by the content providers of the corresponding channels or by third parties. The channel information can also include user account information related to subscription, services, on-demand, pay-per-view, or other content provider services. The user account information can be directly presented with the content information 142 or the content provider information 144 for a particular channel. Alternatively, the user can request the account information when the content information 142 or the content provider information 144 is presented.

The information 142 and 144 about content and content providers can be presented in a standard presentation, such as a text description on a static visual display. The information 142 and 144 can also specify special features, such as animations, short videos, sound effects, or other entertaining presentation features. In one implementation, the special features carry at least a portion of the information 142 or 144. For example, animations or sound effects can identify the corresponding content provider (channel) or the corresponding content (program). Alternatively, the special features can be non-content and non-content-provider specific, and displayed in addition to the standard presentation of the information 142 or 144. For example, text information can be overlaid on a short video presentation.

The memory 140 is controlled by the controller 120, which can store and access the stored data in the memory 140. The controller 120 can store and update the information 142 and 144 in the memory 140 whenever such information is received. For example, a particular content provider can send to the device 100 channel updating data about a channel corresponding to that content provider. The content provider can explicitly assign the channel updating data to update the channel information so that the controller 120 can recognize the purpose of the received data and update the channel information accordingly. The information 142 and 144 about content and content providers can be received by the bi-directional communication component 170. In one implementation, the controller 120 uses the bi-directional communication component 170 to request updates for the information 142 and 144. Alternatively, the information 142 or 144 can be embedded in the digital broadcast signal 10 and received by the broadcast receiver 110.

In one implementation, the controller 120 is configured to identify, access, and process different portions of the content information 142 or the content provider information 144. For example, the controller 120 can identify which portion of the information 142 and 144 corresponds to which broadcast channel. The controller 120 can access and process the desired portion of the information in the memory 140 to generate corresponding video data, and use the display 150 to present the generated video data. In alternative implementations, the controller 120 can generate audio data from the channel information in the memory 140. The generated audio data can be presented by an internal or external audio component (not shown).

In one implementation, the controller 120 can be configured to control the time period associated with the channel change. For example, the controller 120 can ensure that the channel information 142 or 144 be presented during or within the channel change time period. Information regarding a duration for a channel change can be included in the channel information or the digital broadcast signal. Thus, the time period associated with the channel change can be controlled so as to enable an appropriate presentation of the channel information 142 or 144 during or within the channel change time period.

In one embodiment, the digital broadcast receiving device 100 presents at least a portion of the content information 142 or the content provider information 144 to a user during channel changing to diminish any perceived delay. For example, upon receiving a channel change request 135, the controller 120 causes the display 150 to present a portion of the channel information 142 or 144. In one implementation, the displayed information corresponds to a current program or content provider of the new channel that is selected by the channel request 135. If the device 100 promptly displays information directly relevant to the selected channel, the user may perceive that his or her channel request has been promptly processed.

In some embodiments, presenting a portion of the content information 142 or the content provider information 144 is used in conjunction with buffering multiple channels during the channel change to even further optimize a user's experience. In particular, when a first channel change request 135 triggers switching from the power saving mode 122 to the channel changing mode 124, no broadcast data is buffered yet for the requested channel. Thus, there can be a substantial channel changing delay before broadcast data becomes available for the channel specified by the first channel change request 135. The controller 120, however, can use the display 150 to present a portion of the channel information 142 or 144, which can be for the selected channel or program. This reduces the delay perceived by a user. In addition, because content is buffered in anticipation for additional channel changes, the time required to display a new program is also reduced. This reduces the actual delay associated with changing channels during channel surfing.

Furthermore, by identifying the content provider or the current program, the displayed information may also help the user navigate through the different broadcast channels. For example, the controller 120 can use the display 150 to present a corresponding portion of the information 142 or 144 during channel surfing each time a new channel is requested, even if broadcast data is readily available for the new channel. For example, channel logos or programming information can be displayed upon receiving second and subsequent channel change requests 135 in the channel changing mode 124, even though broadcast data has been buffered and thus immediately available for the subsequently selected channels. In one implementation, a portion of the channel information 142 or 144 is displayed as long as the channel change delay lasts if such delay is present, and for a shorter, predetermined time if the broadcast data is readily available.

The display 150 presents a currently selected broadcast program or other information in a form usable to a user, for example, audio, visual or audio/visual. For example, the display 150 can include a cathode ray tube (CRT), a liquid crystal display (LCD), one or more light emitting diodes (LEDs), or any other suitable presentation device. The display 150 can also include a speaker to present audio information. The device 100 can also be configured to use an external display device instead of or in addition to using the display 150.

The power source 160 provides power to all elements of the device 100. The power source 160 can include an internal source, stand-alone source, or circuitry to receive, and if necessary transform, external power. In hand-held devices, for example, the power source 160 can be implemented using a battery, which has limited life time between charges, and circuitry to receive external power to operate the device 100 or charge the battery. In non-portable devices, the power source 160 includes circuitry to receive external power, and optionally, it can also include a battery, for example, to provide stand-by power in the absence of external power.

The bi-directional communication component 170 provides bi-directional communication between the device 100 and a communication network, such as a phone network, a local area network, or the Internet (not shown). For example, the device 100 can be a cell phone in which the bi-directional communication component 170 is used to provide phone communication or data transfer. The bi-directional communication component 170 is controlled by the controller 120, which can receive or send data through the communication component 170. In one embodiment, the bi-directional communication component 170 can be used to update the channel information, including the content information 142 and the content provider information 144, contained in the memory 140 with new or additional information or applications.

Figure 2:
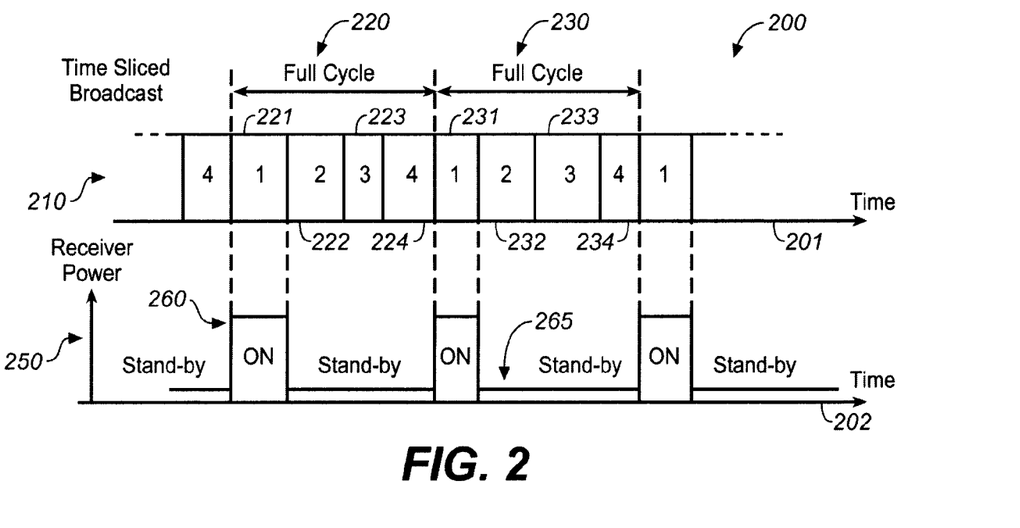
FIGS. 2 and 3 are diagrams illustrating examples of receiving digitally broadcast data in power saving and channel changing modes, respectively.

FIG. 2 is a timing diagram 200 illustrating an exemplary implementation of receiving digital broadcast data in a power saving mode of a digital broadcast receiving device, such as the device 100 (FIG. 1). The digital broadcast receiving device includes a broadcast receiver to receive a digital broadcast 210 transmitted by a time division technique.

In general, time division techniques can be used to save power in the broadcast receiving device. As data is transmitted only in particular time slices for a channel that is currently displayed, the device can receive and buffer the data for that channel during the particular time slices, and switch the device's receiver to a low power consumption state, called a stand-by state, between those particular time slices. In the stand-by state, no broadcast data is received, only the previously buffered data is processed. Thus, power can be saved without losing data from the currently displayed channel. This power saving feature makes time division a preferred broadcast technique if the broadcast is directed to portable devices, such as handheld devices, in which the power source is typically a battery with a limited life time.

The timing diagram 200 illustrates the time sliced digital broadcast 210 and a power consumption rate 250 of the broadcast receiver as a function of time, which is illustrated by a first time axis 201 and a second time axis 202. The first and second time axes 201 and 202 are aligned to represent the same time instances at the same horizontal positions.

The digital broadcast 210 includes data for broadcast channels 1-4 in periodic cycles, such as the first and second cycles 220 and 230. In the first cycle 220, data is transmitted for the broadcast channels 1-4 in consecutive time slices 221-224, respectively; in the second cycle 230, data is transmitted for the broadcast channels 1-4 in consecutive time slices 231-234, respectively. The duration of the first and second cycles 220 and 230, or the duration of each of the time slices 221-224 and 231-234 can be predetermined or dynamically selected by a corresponding broadcast protocol. In alternative implementations, the digital broadcast signal 210 can include data for less or more broadcast channels, or can follow any time divisional broadcast technique or standard.

The power consumption rate 250 is illustrated when the receiver is configured to receive data only for the first broadcast channel (channel '1') in the power saving mode. Accordingly, the broadcast receiver is fully active (ON) during the "active" time slices 221 and 231 when data is transmitted for the first channel. In the fully active (ON) state, the power consumption rate 250 of the receiver has an active value 260.

Between the active time slices 221 and 231, the broadcast receiver is switched to a stand-by state, in which no data is received and processed from the broadcast 210. In the stand-by state, however, no data is lost from the first broadcast channel, because the broadcast 210 includes data in the time slices 222-224 only for the "non-active" broadcast channels 2-4. Because the broadcast receiver does not use energy to detect and process broadcast signals in the stand-by state, its power consumption rate 250 is reduced to a stand-by value 265 that is substantially smaller than the active value 260. The stand-by value 265 of the power consumption rate depends on details of the receiver's hardware, and in some implementations, it can be substantially zero.

In the power saving mode, the device switches back and forth the receiver between the fully active (ON) state and the stand-by state. In each cycle of the digital broadcast 210, the receiver is fully active during the active time slice in which data is transmitted for the first channel, and is switched to the stand-by state in between. The exact timing of the switch can depend on details of the broadcast receiver's hardware or other considerations. For example, the hardware may have a "power-up" time, such as for example about 100 msec, during which the receiver reaches its fully active (ON) state from the stand-by state. Accordingly, the receiver has to start the switch to the fully active (ON) state before an active time slice at least the power-up time earlier.

Figure 3:
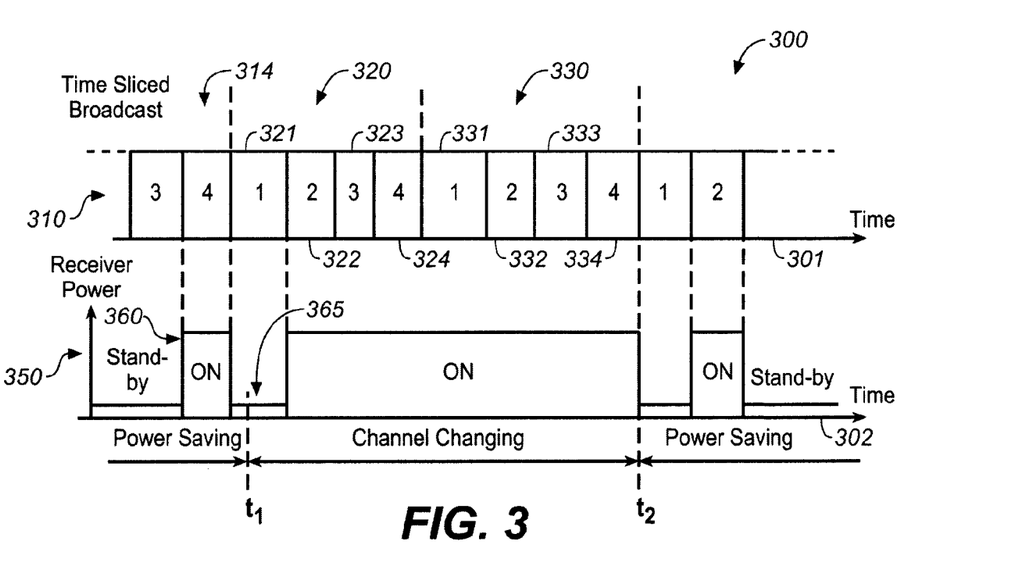

FIG. 3 is a timing diagram 300 illustrating an exemplary implementation of switching between a power saving mode and a channel changing mode in a digital broadcast receiving device, such as the device 100 (FIG. 1). The digital broadcast receiving device includes a broadcast receiver to receive a time sliced digital broadcast 310.

The timing diagram 300 illustrates the time sliced digital broadcast 310 and a power consumption rate 350 of the broadcast receiver as a function of time, which is illustrated by a first time axis 301 and a second time axis 302, respectively. The first and second time axes 301 and 302 are aligned to represent the same time instances at the same horizontal positions.

In the exemplary implementation, the digital broadcast 310 transmits data for broadcast channels 1-4 in periodic cycles, such as the first and second cycles 320 and 330. In the first cycle 320, data is transmitted for the broadcast channels 1-4 in consecutive time slices 321-324, respectively; in the second cycle 330, data is transmitted for the broadcast channels 1-4 in consecutive time slices 331-334, respectively.

Before the first cycle 320, the broadcast receiver has been configured to receive data only for the fourth broadcast channel (channel '4') in a power saving mode, such as the power saving mode described above with reference to FIGS. 1 and 2. Accordingly, the broadcast receiver is fully active (ON) during "active" time slices, such as a time slice 314, when data is transmitted for the fourth channel, and the receiver is switched to a stand-by mode between the active time slices. The power consumption rate 350 of the receiver has an active value 360 in the fully active (ON) state, and a smaller stand-by value 365 in the stand-by state.

During the first cycle 320, the device receives a channel change request at time t1, and switches to the channel changing mode. In the channel changing mode, the receiver is kept in its active (ON) state continuously to receive and buffer data from all available channels 1-4 in the broadcast 310. Accordingly, the receiver's power consumption rate is at the active level 360 throughout the channel changing mode. As data is processed and buffered for all channels 1-4, the buffered data is available to display any of those channels if the user wants to channel surf. Thus, channel change delays can be substantially reduced for channel surfing.

At the end (t2) of the second cycle 330, the broadcast receiving device switches back to a power saving mode in which broadcast data is received only for a newly selected second channel (channel '2'), and the receiver is switched to the stand-by state in between. The switch to the power saving mode can be explicitly requested by the user, or can be automatically performed by the device if no more channel change requests are received.

Although the total power consumption is increased in the channel changing mode compared to the power saving mode (compare, for example, the power consumption rate 350 in FIG. 3 with the power consumption rate 250 during the second cycles 230 and 330, respectively), the increase in power consumption can be limited by returning to the power saving mode after a short time period, such as a few full cycles of the digital broadcast.

Figure 4:
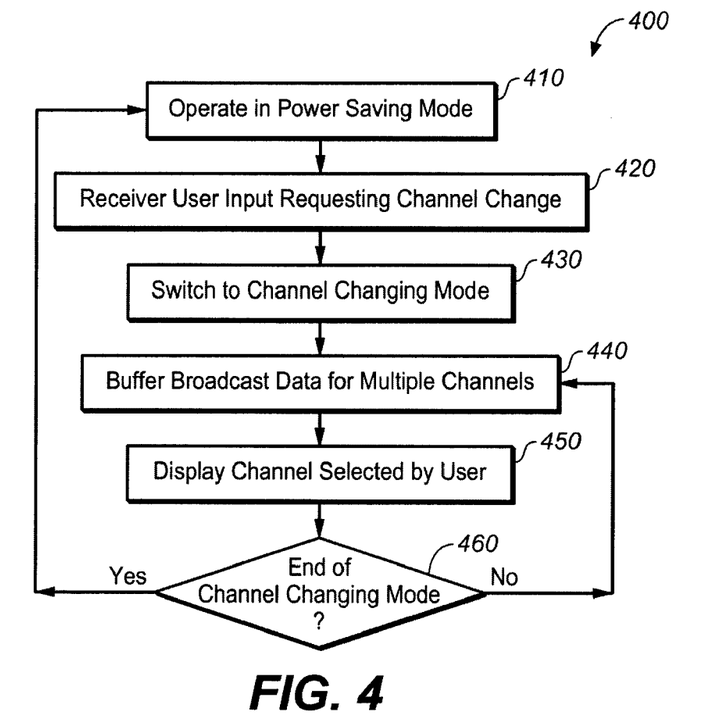
FIGS. 4 and 5 are flow diagrams of methods for channel changing.

FIG. 4 illustrates a method 400 for operating a digital broadcast receiving device, such as the device 100 (FIG. 1). The digital broadcast receiving device includes a broadcast receiver to receive a digital broadcast including multiple broadcast channels transmitted by a time division technique. For example, different broadcast channels can be transmitted in different time slices of periodic cycles.

The device operates in a power saving mode (step 410). In the power saving mode, data is received and processed only for a currently displayed broadcast channel, and the broadcast receiver is switched to a power saving stand-by state between active time slices that include data for the currently displayed channel.

The device receives a user input requesting a channel change (step 420). For example, the user can enter the channel change request by activating a "Channel Up" or a "Channel Down" button, or numeric keys corresponding to the newly selected channel. Or the user can enter a request for a program guide. In one implementation, the device includes a voice recognition system that can recognize audio commands requesting a change to another broadcast channel.

Upon receiving the channel change request, the device switches to a channel changing mode (step 430), in which the device receives and buffers broadcast data for multiple channels (step 440). The multiple channels are buffered in anticipation of further channel changing requests during channel surfing.

The device displays channels requested by the user (step 450). If the user selects one of the buffered channels, the device can use the buffered data to display the newly selected channel without substantial delay.

The device decides whether the channel changing mode should be ended or not (decision 460). For example, the device can verify if the user explicitly requested to end the channel changing mode. The channel changing mode can also be ended after a predetermined time, or if the channel surfing ended. To detect the end of the channel surfing, the device can monitor the number of channel change requests received over a time period, such as two or three full cycles of the digital broadcast, and determine that the channel surfing ended if that number is less than a preset threshold. For example, the channel surfing is ended if no channel change requests have been received over the time period.

If the channel changing mode is not ended ("No" branch of decision 460), the device keeps buffering data for the multiple channels (step 440), and displaying any channel that is selected by the user (step 450).

If the channel changing mode is ended ("Yes" branch of decision 460), the device switches back to operate in the power saving mode (step 410) in which data is received only for the currently selected channel.

Figure 5:
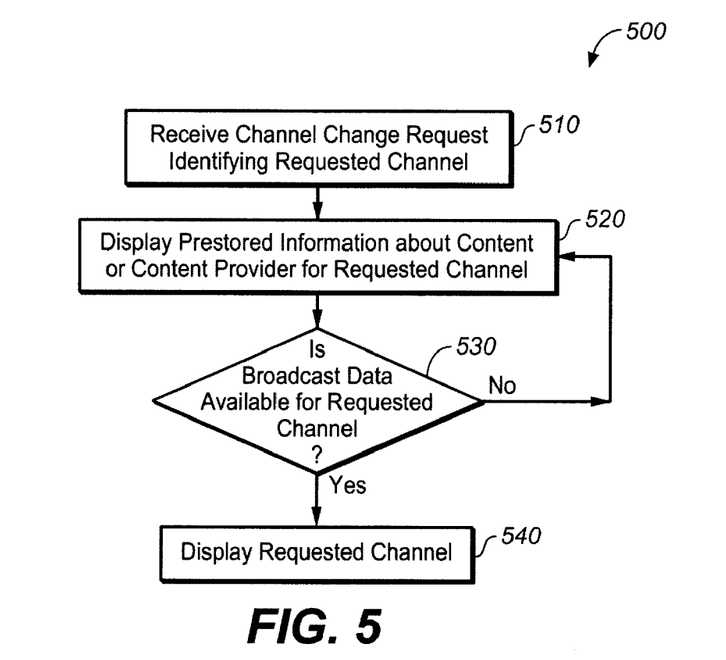

FIG. 5 illustrates a method 500 for channel changing in a broadcast receiving device, such as the device 100 (FIG. 1). In one implementation, the broadcast receiving device receives a digital broadcast including multiple broadcast channels transmitted by a time division technique in which different broadcast channels are transmitted in different time slices of periodic cycles.

The method 500 can be implemented to reduce a perceived channel change delay caused by the time division technique. For example, the method 500 can be implemented to reduce the perceived channel change delay as the device switches from a power saving mode to a channel changing mode as described above with reference to FIG. 4. In alternative implementations, the method 500 can be implemented separately from the power saving and channel changing modes. The method 500 can help a user navigate through multiple channels in the digital broadcast receiving device.

The device receives a channel change request identifying a new broadcast channel to be displayed by the device (step 510). For example, the device can receive a user input, such as a Channel Up or a Channel Down command, requesting the new broadcast channel.

Upon receiving the channel change request, the device displays channel information, such as information about current content or a content provider for the requested channel (step 520). The displayed channel information can include prestored information, for example, a channel logo of the requested channel. Or the displayed channel information can include a title of the current program broadcast in the requested channel. The channel information can also include advertisements, account information, or special effects, such as animation, video or sound effects. In one implementation, the channel information is displayed for a predetermined time, such as between about one and three seconds. The display time can also be determined or controlled based on a duration of an advertisement that is included in the displayed channel information. The display time can be determined or controlled based on information that is provided by the content provider, for example, in the channel information. Alternatively, the channel information can be displayed for an undefined period that ends when a further operation uses the display. A short video, for example, can be repeatedly played until display data is buffered for a selected channel.

The device determines whether broadcast data is available for the requested channel (decision 530). For example, the device determines whether sufficient amount of broadcast data has been buffered for the requested channel. If broadcast data is not available for the requested channel ("No" branch of decision 530), the device keeps displaying the channel information (step 520).

If broadcast data is available for the requested channel ("Yes" branch of decision 530), the device displays the current program in the requested broadcast channel.

Figure 6:
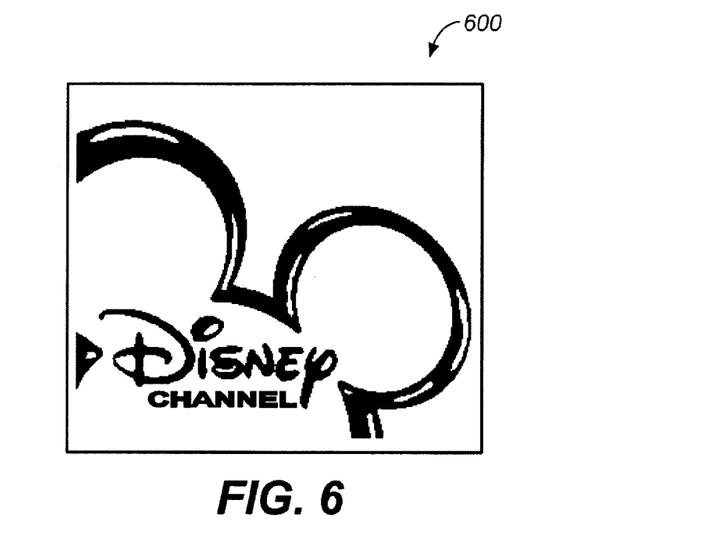
FIG. 6 illustrates an exemplary screen shot that can be displayed during channel change.

FIG. 6 illustrates an exemplary screen shot 600 from a display of a broadcast receiving device, such as the device 100 (FIG. 1), which is configured to receive digital broadcast with a time division technique.

The screen shot 600 illustrates a channel logo that conveys information about a content provider for a current broadcast channel. In the example, the channel logo identifies a television channel, the Disney Channel, as the content provider for the current broadcast channel. In one implementation, the channel logo or other graphical feature has the same size as the video display area. Alternatively, the channel logo or the graphical feature can be displayed in a sub-region of the display area.

The channel logo can be displayed upon receiving a request to switch to the Disney Channel. If the channel logo is displayed without substantial delay, the user's perception of any channel change delay may be reduced. The channel logo, or other channel information, can also be displayed to help the user navigate through multiple channels or provide other information. For example, if the current channel has been requested by its channel number or a Channel Up or Channel Down command, the user may not know that the requested channel is actually the Disney Channel. The displayed channel logo, however, immediately identifies which channel the user has been switched to.

In an alternative implementation, the displayed channel information also includes information about pre-recorded shows from the content provider of the newly selected channel, so that the user can select either the current broadcast or one of the pre-recorded shows. The displayed information can simply indicate that the newly selected channel has readily accessible pre-recorded shows; or the pre-recorded shows can be directly selected based upon the displayed channel information. For example, while "UP" and "DOWN" menu commands are used to access different broadcast channels, the user can navigate with "LEFT" and "RIGHT" commands to access a pre-recorded show at a particular channel. Thus, the user has a simple way to find and access pre-recorded content without the need to open a full menu, such as an Electronic Program Guide (EPG).

The techniques of the present application have been described with reference to particular implementations. Other implementations are within the scope of the following claims, and can include many variations. For example, the channel changing techniques can be implemented in both portable and non-portable digital broadcast receiving devices. Or the channel changing techniques can be implemented in audio broadcast receiving devices. The described methods, or portions of them, can be implemented in software, hardware, or a in a combination of software and hardware. Steps in the described methods can be performed in different order and still provide desirable results.

The invention claimed is:

1. A method for operating a digital broadcast receiving device, the method comprising:
   receiving user input requesting a first broadcast channel to be displayed from a plurality of broadcast channels, each broadcast channel representing a respective stream of media programs;
   upon receiving the user input requesting the first broadcast channel, presenting channel information associated with the first broadcast channel and switching to a channel changing mode of operation in which broadcast data is buffered for two or more broadcast channels;
   verifying whether broadcast data is available for the first broadcast channel; and
   if the broadcast data is available for the first broadcast channel, displaying a current program in the first broadcast channel after presenting the channel information.

2. The method of claim 1, wherein each broadcast channel in the plurality of broadcast channels is broadcast in a respective time slice.

3. The method of claim 1,
   wherein the channel changing mode of operation includes buffering broadcast data for each broadcast channel in the plurality of broadcast channels.

4. The method of claim 1, further comprising:
   switching from the channel changing mode of operation to a power saving mode of operation in which broadcast data is received only for the first broadcast channel.

5. The method of claim 1, wherein the channel information about the first broadcast channel includes information identifying a content provider for the first broadcast channel.

6. The method of claim 5, wherein the information identifying the content provider for the first broadcast channel is prestored in the device.

7. The method of claim 5, wherein the information identifying the content provider for the first broadcast channel includes a channel logo for the first broadcast channel.

8. The method of claim 1, wherein the channel information about the first broadcast channel includes information identifying a currently broadcast program in the first broadcast channel.

9. The method of claim 1, wherein the channel information includes an advertisement.

10. The method of claim 1, wherein presenting the channel information includes displaying the channel information.

11. The method of claim 10, wherein displaying the channel information includes displaying a video or an animation.

12. The method of claim 1, further comprising:
    updating the channel information about the first broadcast channel.

13. A method for operating a digital broadcast receiving device, the method comprising:
    receiving user input requesting a first broadcast channel to be displayed from a plurality of broadcast channels, each broadcast channel representing a respective stream of media programs;
    upon receiving the user input requesting the first broadcast channel, presenting channel information associated with the first broadcast channel, wherein presenting the channel information includes presenting an audio effect;
    verifying whether broadcast data is available for the first broadcast channel; and
    if the broadcast data is available for the first broadcast channel, displaying a current program in the first broadcast channel after presenting the channel information.

14. A method for operating a digital broadcast receiving device, the method comprising:
    receiving user input requesting a first broadcast channel to be displayed from a plurality of broadcast channels, each broadcast channel representing a respective stream of media programs;
    upon receiving the user input requesting the first broadcast channel, presenting channel information associated with the first broadcast channel, wherein presenting the channel information includes presenting information about pre-recorded programs from the first broadcast channel;
    verifying whether broadcast data is available for the first broadcast channel; and
    if the broadcast data is available for the first broadcast channel, displaying a current program in the first broadcast channel after presenting the channel information.

15. A method for operating a digital broadcast receiving device, the method comprising:
    receiving channel information about a first broadcast channel through a bi-directional communication component of the digital broadcast receiving device, the received channel information including video, audio or animation related to the first broadcast channel;
    storing the received channel information in a memory of the digital broadcast receiving device;
    receiving user input requesting the first broadcast channel to be displayed on a display of the digital broadcast receiving device, the request selecting the first broadcast channel from a plurality of broadcast channels, each broadcast channel representing a respective stream of media programs;
    in response to receiving the user input requesting the first broadcast channel, presenting the stored channel information associated with the first broadcast channel, wherein presenting the stored channel information includes presenting the video, audio or animation related to the first broadcast channel;
    verifying whether broadcast data is available for the first broadcast channel while the stored channel information is presented; and if the broadcast data is available for the first broadcast channel, displaying a current program in the first broadcast channel on the display after presenting the stored channel information.

16. A software product, tangibly embodied in a computer-readable medium, for operating a digital broadcast receiving device, the software product comprising executable instructions to cause the device to perform operations comprising:

receiving user input requesting a first broadcast channel to be displayed from a plurality of broadcast channels, each broadcast channel representing a respective stream of media programs;

upon receiving the user input requesting the first broadcast channel, presenting channel information about the first broadcast channel and switching to a channel changing mode of operation in which broadcast data is buffered for two or more broadcast channels;

verifying whether broadcast data is available for the first broadcast channel; and if the broadcast data is available for the first broadcast channel, displaying a current program in the first broadcast channel after presenting the channel information.

17. The software product of claim 16, wherein each broadcast channel in the plurality of broadcast channels is broadcast in a respective time slice.

18. The software product of claim 16, wherein the channel changing mode of operation includes buffering broadcast data for each broadcast channel in the plurality of broadcast channels.

19. The software product of claim 18, further comprising instructions to cause the device to perform operations comprising:

switching from the channel changing mode of operation to a power saving mode of operation in which broadcast data is received only for the first broadcast channel.

20. The software product of claim 16, wherein the channel information about the first broadcast channel includes pre-stored information identifying a content provider for the first broadcast channel.

21. The software product of claim 16, wherein the channel information about the first broadcast channel includes information identifying a currently broadcast program in the first broadcast channel.

22. The software product of claim 16, wherein presenting the channel information includes displaying a video or an animation.

23. The software product of claim 16, further comprising instructions to cause the device to perform operations comprising:

updating the channel information about the first broadcast channel.

* * * * *